(12) United States Patent
Lyubomirsky et al.

(10) Patent No.: US 11,555,890 B1
(45) Date of Patent: Jan. 17, 2023

(54) METHODS AND SYSTEMS FOR PROCESSING LIDAR SIGNALS

(71) Applicant: Marvell Asia Pte Ltd, Singapore (SG)

(72) Inventors: Ilya Lyubomirsky, Santa Clara, CA (US); Jamal Riani, Fremont, CA (US)

(73) Assignee: Marvell Asia Pte Ltd, Singapore (SG)

( * ) Notice: Subject to any disclaimer, the term of this patent is extended or adjusted under 35 U.S.C. 154(b) by 616 days.

(21) Appl. No.: 16/676,319

(22) Filed: Nov. 6, 2019

(51) Int. Cl.
*G01S 7/48* (2006.01)
*G01S 7/486* (2020.01)
*G01S 7/484* (2006.01)
*G01S 17/10* (2020.01)

(52) U.S. Cl.
CPC ............ *G01S 7/4808* (2013.01); *G01S 7/484* (2013.01); *G01S 7/486* (2013.01); *G01S 17/10* (2013.01)

(58) Field of Classification Search
CPC ........ G01S 7/4808; G01S 7/484; G01S 7/486; G01S 17/10
See application file for complete search history.

(56) References Cited

U.S. PATENT DOCUMENTS

| | | | |
|---|---|---|---|
| 10,274,377 B1 * | 4/2019 | Rabb | G01S 17/90 |
| 2020/0174096 A1 * | 6/2020 | Cho | G01S 13/343 |
| 2020/0278431 A1 * | 9/2020 | Zhu | G01S 17/10 |

* cited by examiner

*Primary Examiner* — Mohammed S Rahaman

(57) ABSTRACT

The present invention is directed to lidar systems and methods thereof. More specifically, a lidar receiver converts received light signal to electrical signal. The electrical signal is converted to digital signal. Fast Fourier transform is performed on the digital signal to generate n channels of data. Constant false alarm rate detection is performed to generate n data sets, which is grouped into m clusters of data. Maximum likelihood detection is performed on the m clusters of data.

20 Claims, 15 Drawing Sheets

METHODS AND SYSTEMS FOR PROCESSING LIDAR SIGNALS

CROSS-REFERENCES TO RELATED APPLICATIONS

NOT APPLICABLE

STATEMENT AS TO RIGHTS TO INVENTIONS MADE UNDER FEDERALLY SPONSORED RESEARCH AND DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

Lidar, or "light radar" that is similar to radars in many ways, has a wide range of applications. Among other features, lidars measure distance and speed of objects by illuminating an object with pulsed laser light and measuring the reflected pulses with a sensor. Differences in laser return times and wavelengths can then be used to make digital 3-D representations of the target.

For example, lidars have been used to make high-resolution maps. Lately, with advent and popularity of automated vehicles and drones, lidars are gaining popularity in their applications.

Unfortunately, existing lidars have been inadequate. Therefore, new and improved lidars are desired.

BRIEF SUMMARY OF THE INVENTION

The present invention is directed to lidar systems and methods thereof. More specifically, a lidar receiver converts received light signal to electrical signal. The electrical signal is converted to digital signal. Fast Fourier transform is performed on the digital signal to generate n channels of data. Constant false alarm rate detection is performed to generate n data sets, which are grouped into m clusters of data. Maximum likelihood detection is performed on the m clusters of data.

According to an embodiment, the present invention provides a lidar system, which includes an optical transmitter configured to project chirped light signal. The lidar system also includes an optical receiver configured to receive a reflected light signal, which is based on the chirped light signal reflected off one or more objects. The lidar system further includes a transimpedance amplifier configured to convert the reflected light signal to an electrical signal. The lidar system additionally includes an analog-to-digital converter configured to convert the electrical signal to incoming data. The lidar system further includes a first fast Fourier transform (FFT) module configured to convert a first channel of incoming data to a first transformed data. The lidar system additionally includes a first constant false alarm rate (CFAR) module configured to generate a first data set, which includes a first distance information and a first intensity information. The lidar system additionally includes a clustering module configured to group the first data set to a first cluster. The lidar system further includes a maximum likelihood detection (MLD) module for updating the first data set.

According to another embodiment, the present invention provides a lidar receiver device, which includes a lens for receiving light signal. The device also includes a transimpedance amplifier configured to convert the light signal to an electrical signal. The device further includes an analog-to-digital converter configured to convert the electrical signal to incoming data. The device additionally includes n fast Fourier transform (FFT) modules. Each of the FFT modules is configured to convert a channel of incoming data to a corresponding transformed data. The device also includes n constant false alarm rate (CFAR) module configured to generate a n data sets based on the transformed data. The device further includes a clustering module configured to group the n data sets into m clusters. The device includes a maximum likelihood detection (MLD) module for updating the m clusters.

According to yet another embodiment, the present invention provides a method of operating a lidar, which includes projecting light points by an optical transmitter. The method also includes receiving light points by an optical receiver. The method further includes converting the received light points to electrical signals. The method additionally includes converting the electrical signals to digital signals. The method further includes performing fast Fourier transformation (FFT) on the digital signals to generate n channels of data. The method also includes performing constant false alarm rate (CFAR) detection on the n channels of data to generate n data sets. The method additionally includes grouping the n data sets to m clusters. The method includes performing maximum likelihood detection (MLD) on the m clusters.

It is to be appreciated that embodiments of the present invention provide many advantages over conventional techniques. Among other things, by using clustering and MLD techniques, lidar detection and imaging efficiencies are improved. Compared to existing technology, when processing the same number of points (e.g., light received by lidar optical receiver), a lidar system according to the present invention can provide improved image resolution. And for a given resolution, a lidar system according to the present invention can operate more efficiently by processing smaller amount of data. There are other advantages as well.

Embodiments of the present invention can be implemented in conjunction with existing systems and processes. For example, lidar systems according to the present invention can be manufactured using existing manufacturing process and techniques. More specifically, lidar receivers according to the present invention can be implemented in conjunction with existing components (e.g., lidar transmitter, etc.). Additionally, various lidar detection techniques described according to present invention can be incorporated into the DSP modules of existing lidar systems and devices.

The present invention achieves these benefits and others in the context of known technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Figure 1:
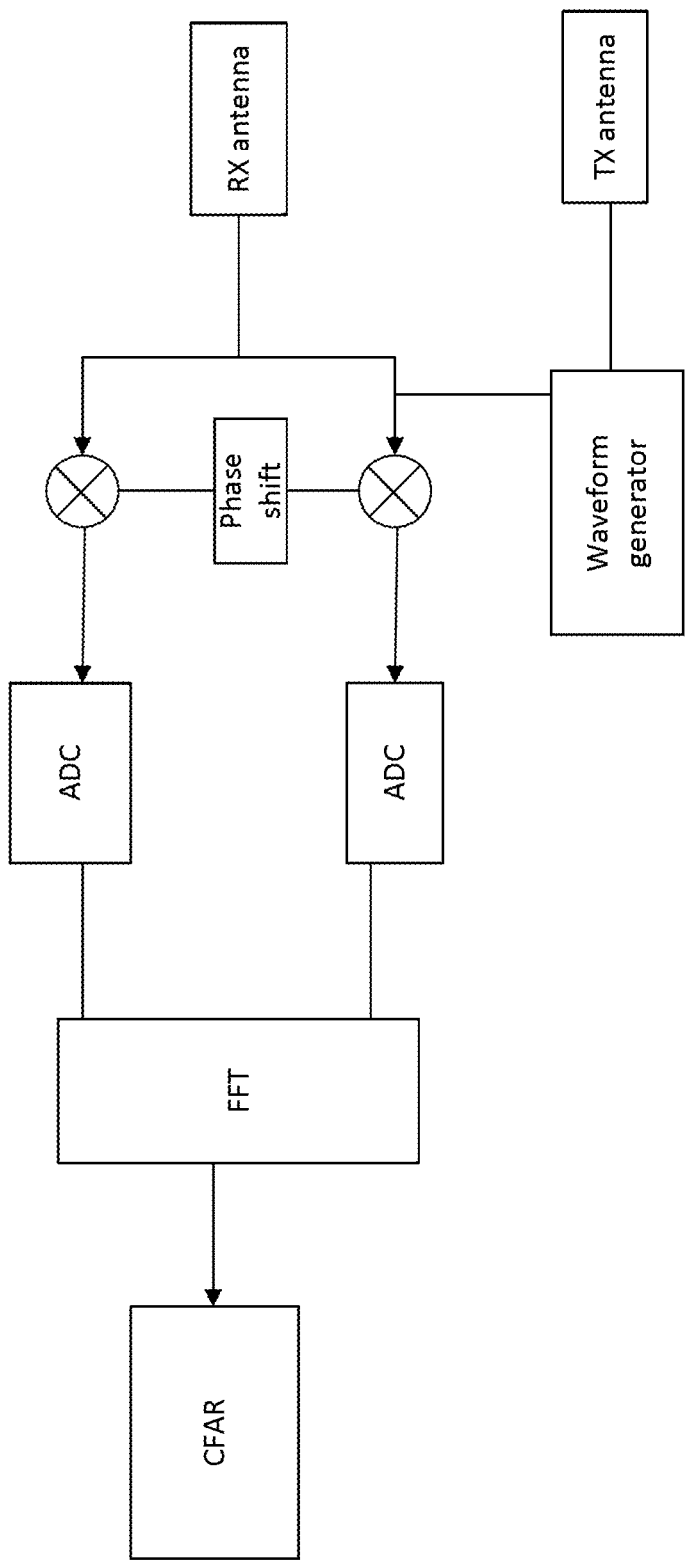
FIG. 1 is simplified diagram illustrating a FMCW radar system.

The present invention is directed to lidar systems and methods thereof. More specifically, a multi-channel lidar receiver converts received light signals from each channel to electrical signals. The electrical signals are converted to digital signals. Fast Fourier transform is performed on the digital signals to generate n channels of data, each channel corresponding to different spatial pixel in the lidar image. Constant false alarm rate detection is performed to generate n data sets, which are grouped into m clusters of data. Maximum likelihood detection is performed on the m clusters of data.

As explained above, existing lidars are inadequate. Similar to radars, performance of lidars depends on, among other things, signal strength and receiver sensitivity. Typically, strong signal strength in lidars requires high-power light source (e.g., usually implemented using infrared laser). High receiver sensitivity in lidars usually requires large optical lenses to capture the reflected light. For practical applications, sizes of light source and optics are limited by physical device implementation, as an automated car or a drone that have limited volume and carrying capacity to accommodate its lidar system. It is thus to be appreciated that embodiments of the present invention improve, other things being equal, lidar performance using digital signal processing (DSP) techniques. Detailed description of lidar systems and methods according to embodiments of the present invention is provided below.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Figure 2:
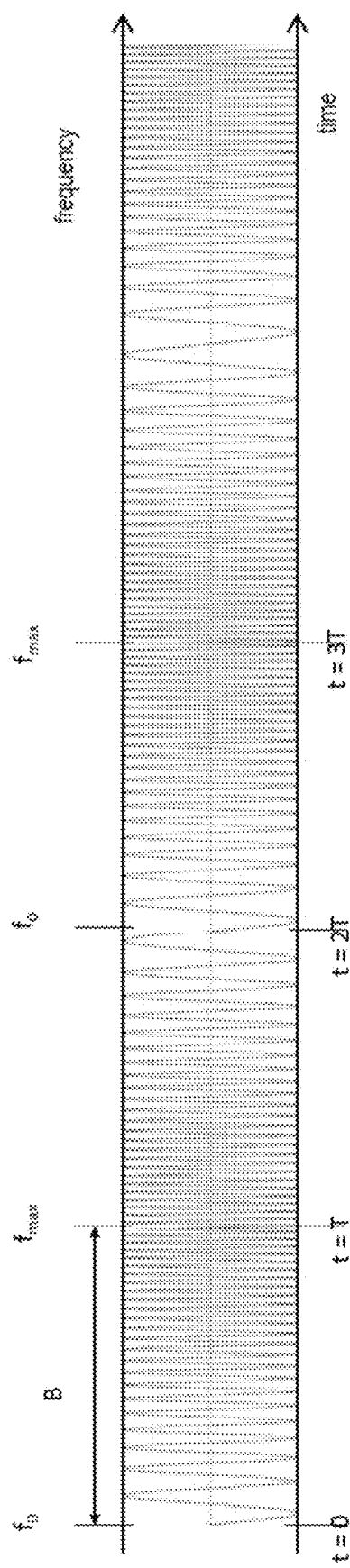
FIG. 2 is a diagram illustrating a FMCW waveform.

FIG. 1 is simplified diagram illustrating an FMCW radar system. A frequency modulation continuous wave (FMCW) radar system, as often implemented for detecting aircrafts, can measure both velocity and distance of an object from the radar. In contrast to continuous wave (CW) radars, FMCW radars performs frequency modulation on its transmission signal (i.e., generated by the wave generator in FIG. 1). FIG. 2 is a diagram illustrating an FMCW waveform. As shown in FIG. 2, the frequency of the FMCW increases from $f_0$ at t=0 to $f_{max}$ at t=T, and then decreases back to $f_0$ at t=2T.

Figure 3:
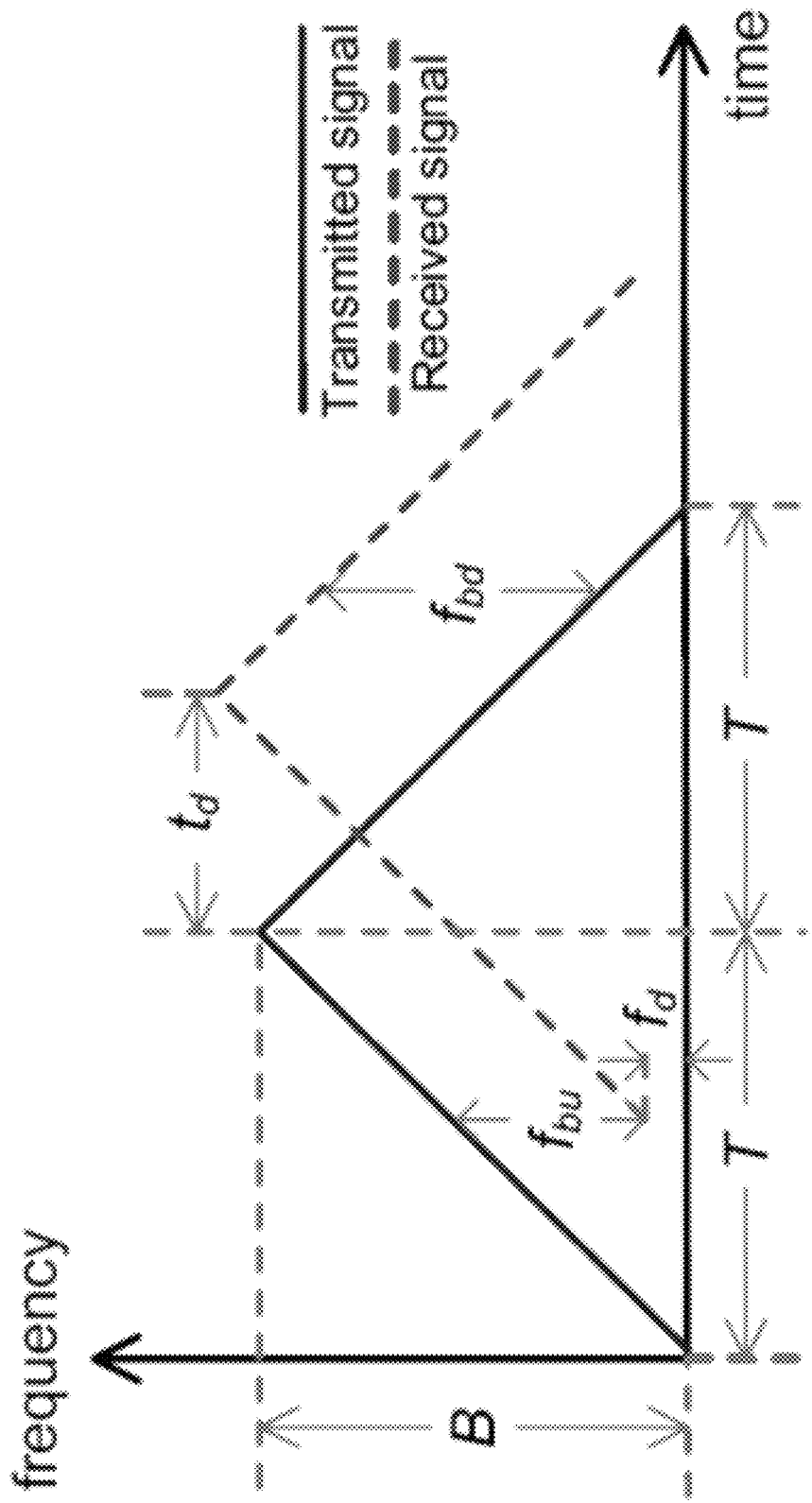
FIG. 3 is a diagram illustrating relationship between a transmitted signal and a received signal in a FMCW radar system.

In principle, FMCW radars operate under Doppler shift theory. FIG. 3 is a diagram illustrating relationship between a transmitted signal and a received signal in a FMCW radar system. In a triangular-shaped frequency modulation, a distance measurement can be performed on both the rising and on the falling edge. In FIG. 3, an echo signal is shifted due to the running time compared to the transmission signal to the right. This shift in time is directly proportional to the target distance. The time shift results in a frequency tone in the detected signal after mixing with the transmitted signal reference in a coherent receiver. Without a Doppler frequency, the amount of the frequency difference during the rising edge is equal to the measurement during the falling edge. A Doppler frequency shifts the echo signal in height. The shift appears at the sum of the frequency difference Δf and the Doppler frequency $f_D$ at the rising edge, and at the difference between these two frequencies at the falling edge. This allows for both target distance and velocity determination, despite the frequency shift caused by the Doppler frequency, which then consists of the arithmetic average of the two parts of measurements at different edges of the triangular pattern. At the same time the accurate Doppler frequency can be determined from two measurements. The difference between the two different frequencies is twice the Doppler frequency. Since the two differential frequencies, however, are not simultaneously available, this comparison requires digital signal processing, with intermediate storage of the measured results.

The Doppler frequency-adjusted frequency for the distance determination and the Doppler frequency of a moving target is calculated using Equation 1 below:

$$f_D = \frac{f_{bu} + f_{bd}}{2} \quad \text{Equation 1}$$

Based to Equation 1, the following equations are derived:

$$f_{bu} = \frac{2R}{c}\frac{B}{T} + \frac{2f_c v}{c} \quad \text{Equation 2}$$

$$f_{bd} = -\frac{2R}{c}\frac{B}{T} + \frac{2f_c v}{c} \quad \text{Equation 3}$$

$$\frac{(f_{bu} - f_{bd})}{2} = \frac{2R}{c}\frac{B}{T} \quad \text{Equation 4}$$

$$\frac{(f_{bd} + f_{bu})}{2} = \frac{2f_c v}{c} \quad \text{Equation 5}$$

The radar maximum detection range $R_{max}$ is described in Equation 6 below:

$$R_{max} = \frac{cT}{2} \quad \text{Equation 6}$$

Since radar detection range is affected by the frequency shift constant "T" illustrated in FIG. 2, long detection range requires long "T" waveform. The FMCW range resolution can be described using in Equation 7:

$$\frac{1}{T} < \frac{(f_{bu} - f_{bd})}{2} = \frac{2R}{c}\frac{B}{T}, \text{ where } \Delta R = \frac{c}{2B} \quad \text{Equation 7}$$

For both radars and lidars, detection process is affected by signal noise. For example, when a signal generated by a lidar with a known frequency (or modulation thereof) hits an object and is reflected back, the receivers of the lidar essentially receives three signals: transmitted signal, reflected signal, and noise. Since the transmitted signal is generated by the lidar itself and thus a known quantity, processing the sum of the transmitted signal and the reflected signal is not an issue. However, the noise that could come from various sources degrades the object detection process. Typically, a lidar system would first determine (e.g., by measurement or estimation) a noise floor. Using the noise floor, the lidar sets a threshold values for processing the received signal. That is, signals received at lidar, if below the threshold value, would be ignored, as they are likely noise. To be useful, a lidar needs to transmit signal an order higher than the noise (e.g., infrared light at the operating environment)

Figure 4:
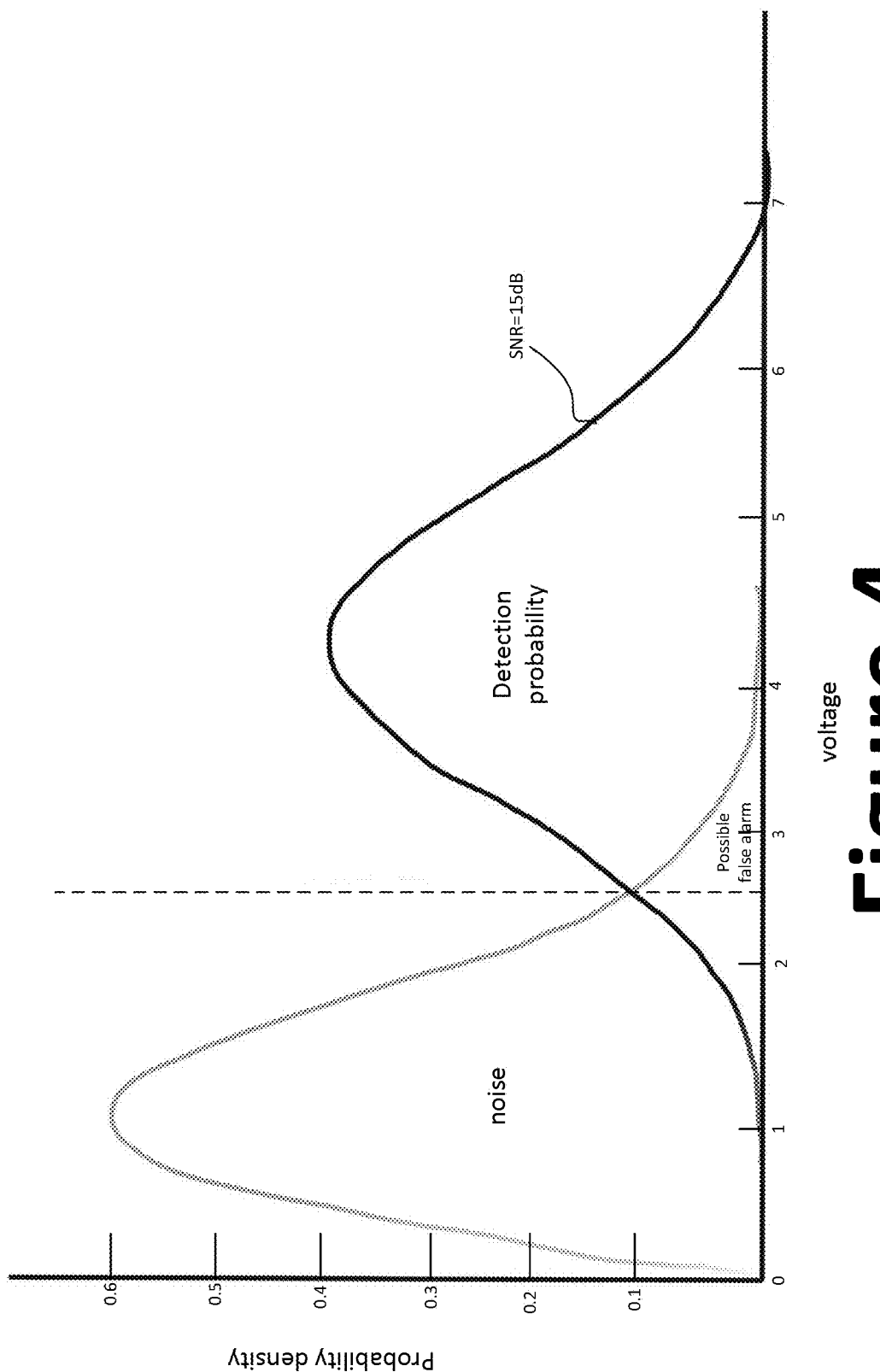
FIG. 4 is a simplified diagram illustrating a radar target detection mechanism.

FIG. 4 is a simplified diagram illustrating a radar target detection mechanism. As shown in FIG. 4, the probability of noise peaks at about 1 unit of voltage, and between about 2.5 to 4 units of voltage this probability quickly drops from 10% to 0. Received signal at 2.5 units of voltage has a 10% detection probability (about the same as the noise probability), and thus the overlapped region between 2.5 to 4 units of voltages has a probability for false alarms, which drops quickly. An objective of a lidar system is to maximize the detection probability $P_D$ and minimize the false alarm probability. By increasing signal strength, the signal to noise ratio (SNR) can be improved. For example, at about 5 units of voltage, the SNR of received signal (i.e., signal and noise combined) is about 15 dB. It is to be appreciated that according to various embodiments of the present invention, i.e., lidar performance (as measured in efficiency, detection probability, and other factors) is enhanced by signal processing techniques.

Figure 5:
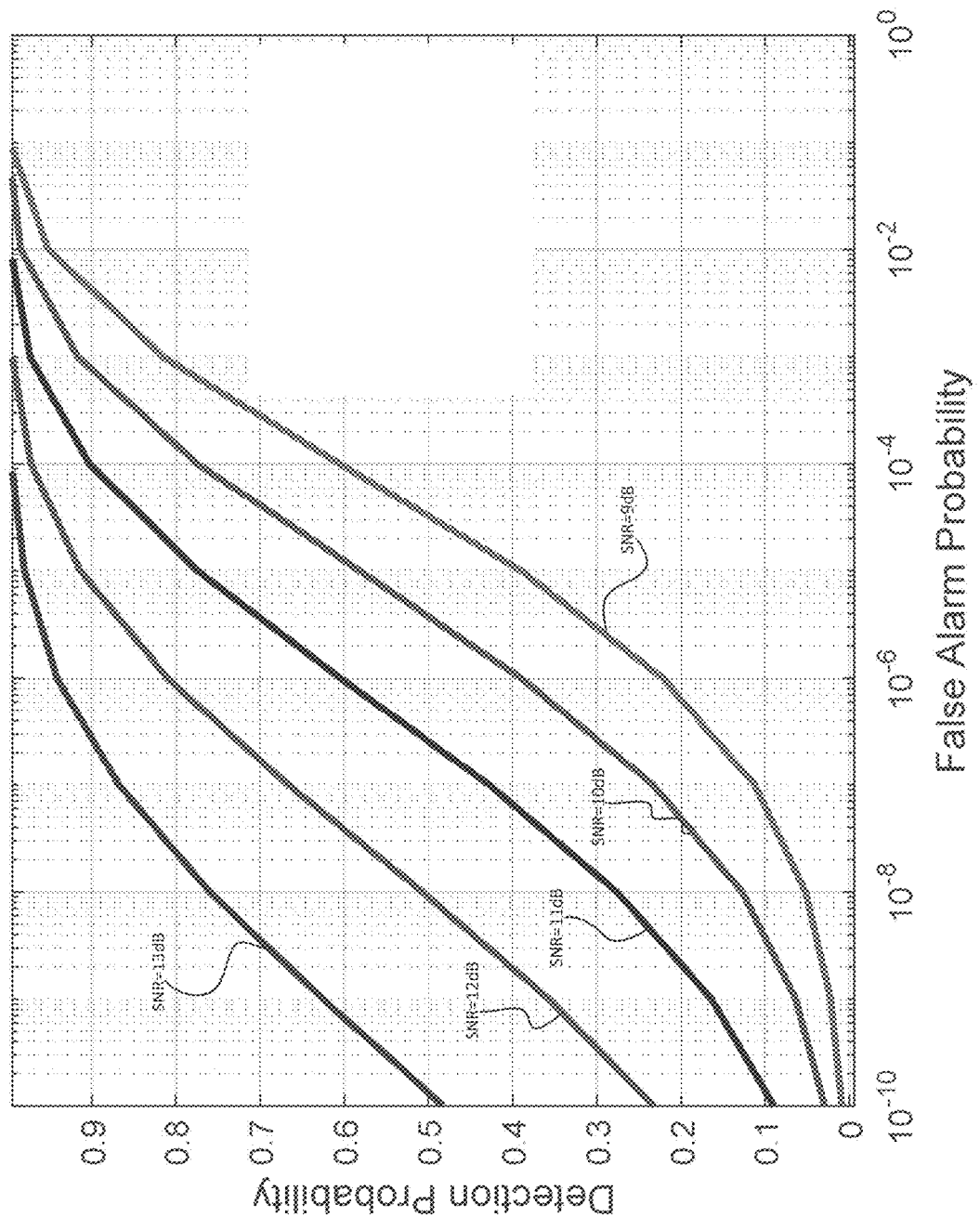
FIG. 5 is a graph illustrating false alarm probably in a radar system.

FIG. 5 is a graph illustrating false alarm probability in a coherent lidar system. For example, in a lidar system it is desirable to have high detection probability and low false alarm probability. As can be seen in FIG. 5, for each 1 dB increase in SNR, detection probability significantly increases relative to the false alarm probability.

Figure 6:
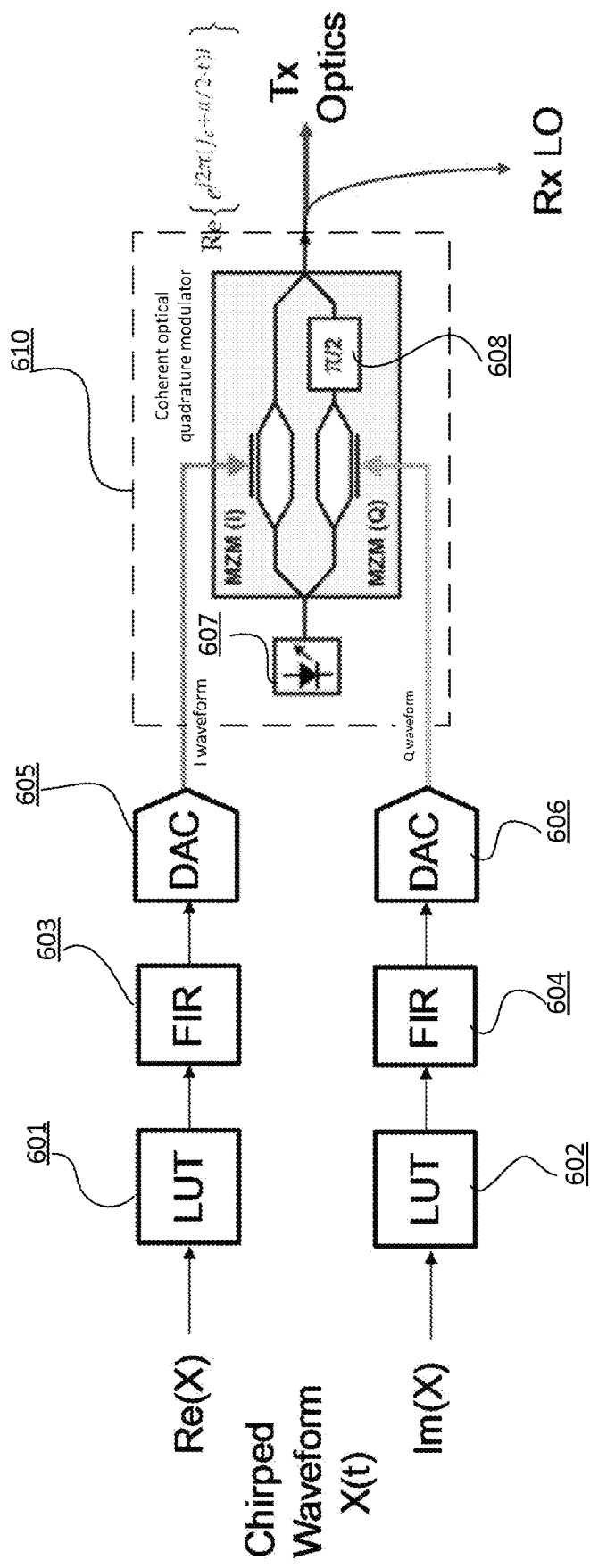
FIG. 6 is a simplified diagram illustrating a transmitter of an optical FMCW system according to embodiments of the present invention.

FIG. 6 is a simplified diagram illustrating a transmitter of an optical FMCW system according to embodiments of the present invention. This diagram is merely an example, which should not unduly limit the scope of the claims. One of ordinary skill in the art would recognize many variations, alternatives, and modifications. The FMCW signal is provided in the format of a chirped waveform X(t) as shown, which has both a real component Re(X) signal and an imaginary component Im(X) signal. On the path of the Re(X) signal, the real component of the chirp waveform is processed using a look up table (LUT) to pre-compensate for transmitter nonlinearities 601. Depending on the implementation, it is to be appreciated that the chirped waveform can be pre-compensated for non-linearity in other ways in lieu of the LUT 601. The converted digital signal is then processed by the finite impulse response (FIR) filter 603 to pre-compensate for any transmitter bandwidth limitations, such as in driver, modulator and or electrical traces. DAC 605 converts the filtered signal received from FIR filter 603 to a driving signal, which is provided to modulator 610. For example, modulator 610 is implemented using a coherent optical quadrature that includes a laser diode 607 and a Mach-Zehnder modulator (MZM). For example, the MZM (I) as shown uses driving signal from DAC 605 to modulate the laser generated by laser diode 607, and MZM(I) generates the I component of output optical signal. For example, laser diode 607 generates infrared laser light, and the output from the Tx optics is invisible infrared laser light.

On the path of Im(X) signal, the imaginary component of the chirp waveform is processed using a look up table (LUT) to pre-compensate for transmitter nonlinearities 602. For example, the chirped waveform can be pre-compensated for nonlinerity in other ways in lieu of the LUT 602. The converted digital signal is then processed by the finite impulse response (FIR) filter 604 to pre-compensate for any transmitter bandwidth limitations, such as in driver, modulator and or electrical traces. DAC 606 converts the filtered signal received from FIR filter 604 to a driving signal to modulator 610. The MZM(Q) as shown uses driving signal from DAC 606 to module the laser generated by laser diode 607. Phase shift 608 provides phase shifting for the modulated optical signal from MZM(Q).

Depending on the implementation, the transmitter (Tx) optics can provide various functions. For example, Tx optics combines I and Q component of the output signal respectively from MZM(I) and MZM(Q). Additionally, Tx optics may focus the output signal at a specific angle or distance.

It is to be noted that in a lidar system, the receiver processes both the transmitted signal (e.g., from Tx optics in FIG. 6) and received signal (i.e., transmitted signal reflected from objects). For example, the transmitted signal and the received signal are combined by a mixer at the receiver of the lidar system for processing.

Figure 7:
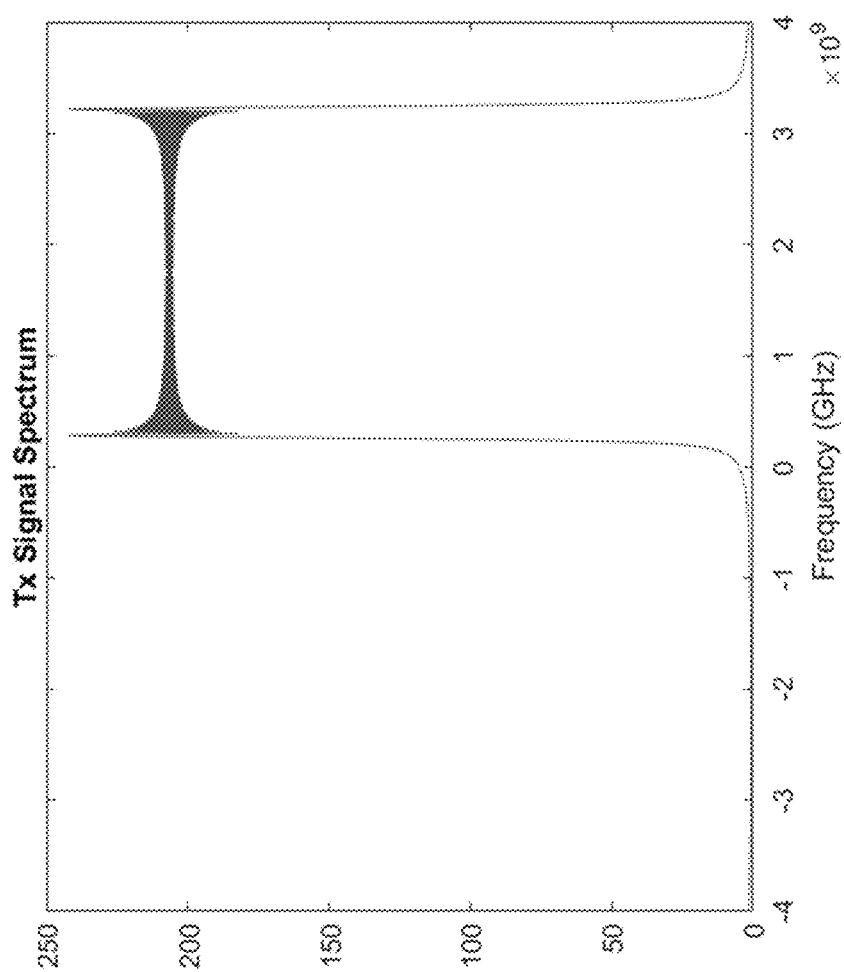
FIG. 7 is a simplified diagram illustrating the signal spectrum of an optical transmitter according to embodiments of the present invention.

FIG. 7 is a simplified diagram illustrating the signal spectrum of an optical transmitter according to embodiments of the present invention. This spectrum corresponds to a simple linear chirp. As shown in FIG. 7, the chirped signal spectrum can be in the band of 0 to about 3 GHz. It is to be appreciated that for lidar applications, it is highly desirable for the output signal to be substantially linear. Depending on the implementation, other frequency bands can be used as well.

Figure 8:
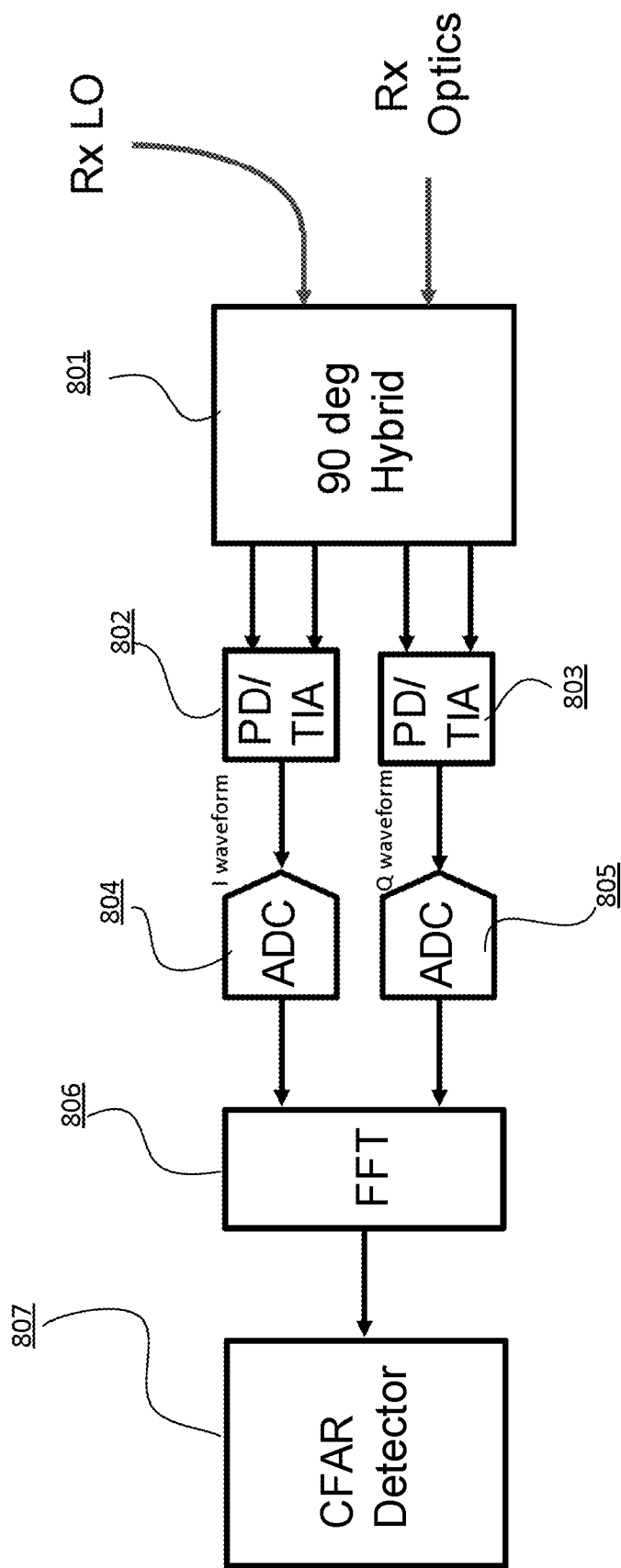
FIG. 8 is a simplified diagram illustrating a receiver of an optical FMCW system according to embodiments of the present invention.

FIG. 8 is a simplified diagram illustrating a receiver of an optical FMCW system according to embodiments of the present invention. This diagram is merely an example, which should not unduly limit the scope of the claims. One of ordinary skill in the art would recognize many variations, alternatives, and modifications. As explained above, the received signal (received from the Rx Optics) and transmitted signal (Rx LO signal) are received and combined at the optical receiver 801. For example, optical receiver 801 includes a 90-degree hybrid optical coherent receiver, which minimizes noise and power loss. For example, a 90-degree shift is introduced between orthogonally polarized beam components by a quarter-wave plate, and the output ports are phase-shifted by 180 degrees through the sole use of the half-wave plates and polarizing beam splitters.

Optical receiver 801 outputs two phased shifted optical signals, which include both I component and Q component. The I component is processed along the top signal path, which includes blocks 802 and 804. The I component of the optical signal is converted to I waveform at block 802, which comprises a photodetector (PD) and a transimpedance amplifier (TIA). The I waveform is converted to digital signal by ADC 804. The Q component is processed along the top signal path, which includes blocks 803 and 805. The Q component of the optical signal is converted to I waveform at block 803, which comprises a PD and a TIA. The Q waveform is converted to digital signal by the ADC 805. The digitized I and Q components are processed at block 806 using a fast four transformation (FFT) algorithm, and the output of FFT 806 can be processed for objection detection. For example, FFT produces a spectral representation (e.g., in frequency domain) that allows for object detection. Object detection is performed by the constant false alarm rate (CFAR) detector 807. For example, the CFAR uses a predetermined threshold to distinguish between noise and useful signal. According to various embodiments, CFAR detector uses various DSP techniques to improve signal detection accuracy. For example, by analyzing a cluster of related data and using maximum likelihood detection techniques, a DSP according to embodiments of the present invention can achieve a higher SNR compared to conventional systems.

Figure 9:
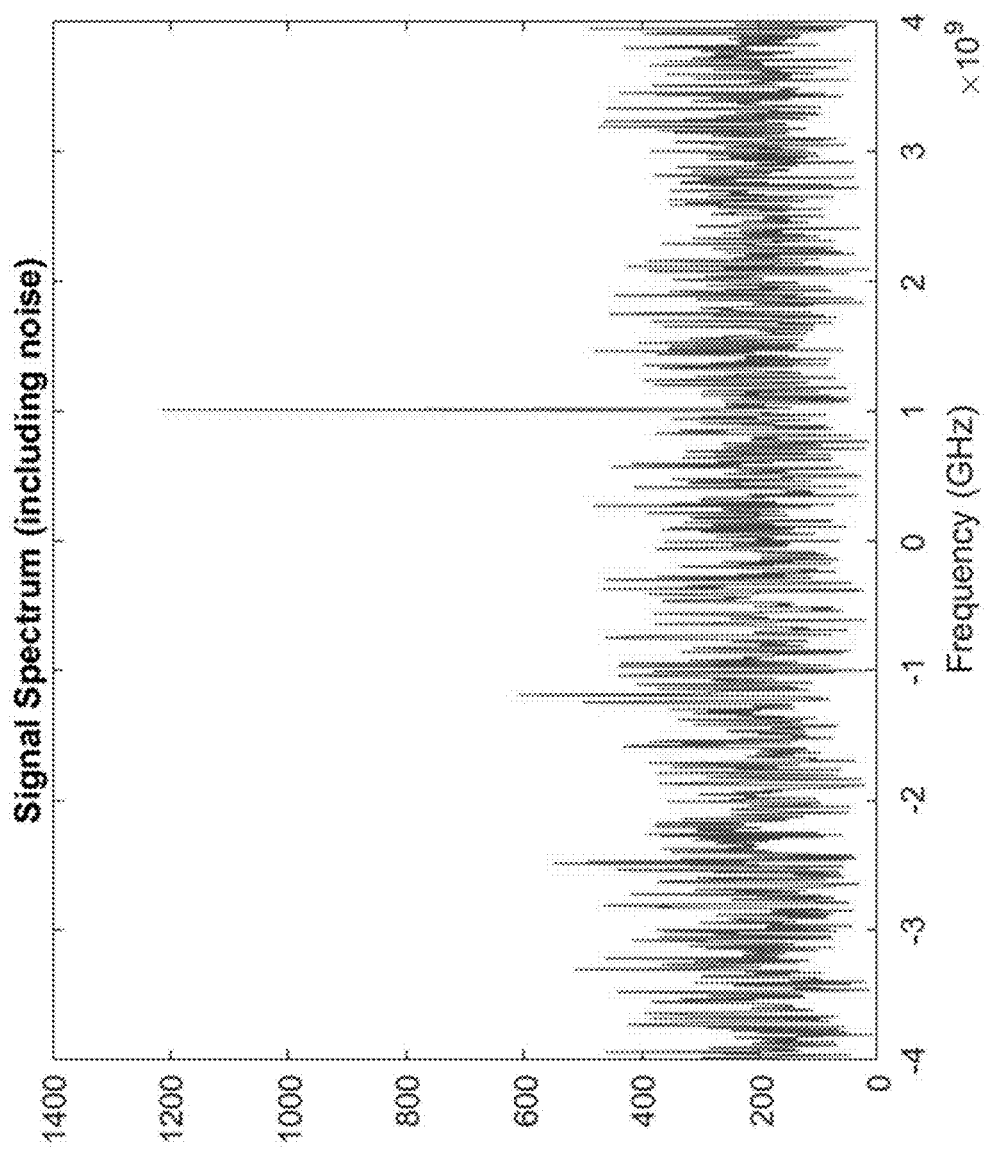
FIG. 9 is a simplified diagram illustrating signal spectrum in a lidar system according to embodiments of the present invention.

FIG. 9 is a simplified diagram illustrating the FFT spectrum in a lidar system according to embodiments of the present invention. For example, at a frequency of about 1 GHz, there is a tone whose amplitude is much higher (at about 1200 units) than other portions of the spectrum (e.g., below 600 units). For example, the SNR of the received signal here is about 13 dB, and the frequency at about 1 GHz can thus be safely deemed an indication of object detection. For this simple linear chirp lidar example, detection of the tone frequency determines the detected object range. Using more sophisticated triangular chirp waveforms, one would detect 2 tone frequencies according to FIG. 3, and the 2 tone frequencies would determine both object range and velocity.

Figure 10:
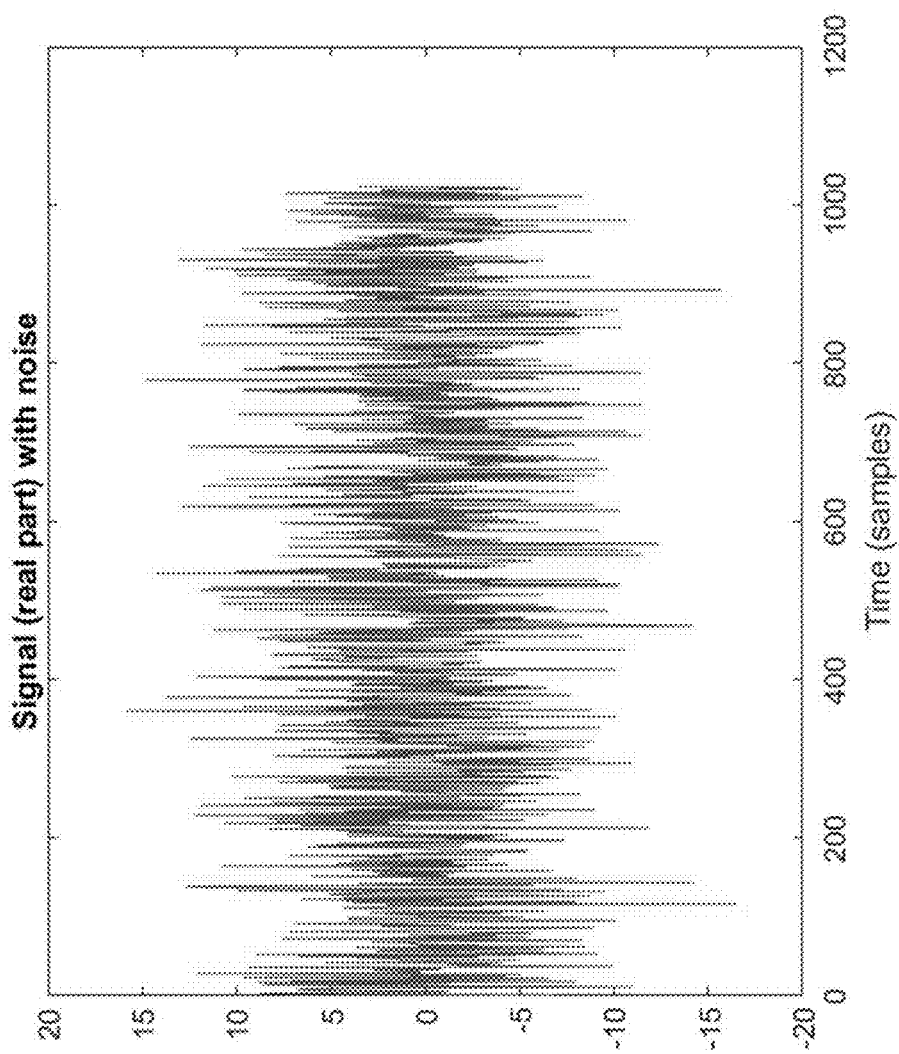
FIG. 10 is a simplified diagram illustrating signal with noise in a lidar system according to embodiments of the present invention.

FIG. 10 is a simplified diagram illustrating signal with noise in a lidar system according to embodiments of the present invention. As shown in FIG. 10, the real component of the signal oscillates between about −15 units and about +15 units. The magnitude of signal is not much higher (might even be lower) than noise, with an SNR of about −13 dB. As a result, the lidar system would conclude that there is no object detection.

Figure 11:
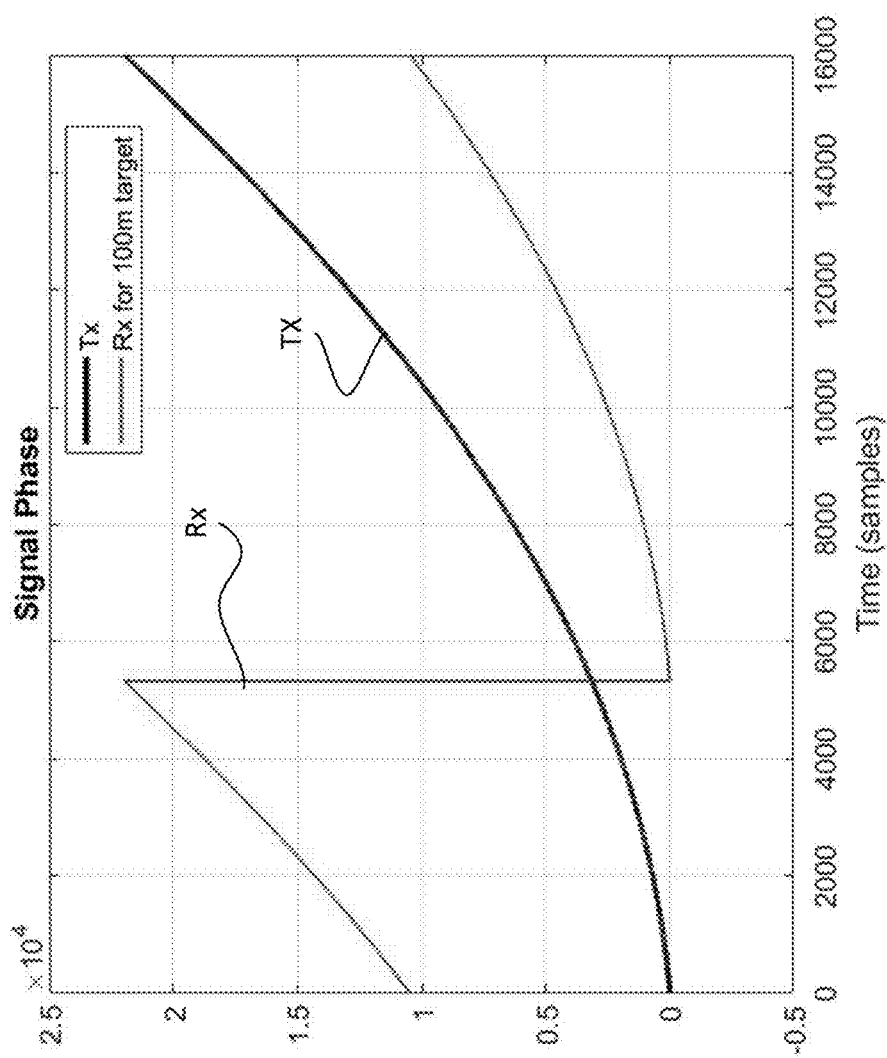
FIG. 11 is a simplified diagram illustrating signal phase in a lidar system according to embodiments of the present invention.

FIG. 11 is a simplified diagram illustrating signal phase in a lidar system based on a linear chirp, according to embodiments of the present invention. As shown in FIG. 11, the phase of the transmitted signal (Tx) is a continuous curve. In contrast, the received signal (Rx) that is reflected off an object 100 m away, has an abrupt phase change at about 5000 units of time. Depending on the implementation, phase information of the received signal can be used for object detection.

A lidar with only a signal point can only detect the existence of an object at certain distance. For most applications, a lidar is used to determine the shape of target objects. To determine shapes of objects, the lidar needs to gather many points and to use image processing algorithm to generate shapes from these points. A high lidar image resolution requires a high number of points. For example, lidar image resolution is described in Equation 7 below:

$$R = \frac{HFOV}{\Delta\theta} \cdot \frac{VFOV}{\Delta\phi} \cdot Q \qquad \text{Equation 7}$$

Figure 12:
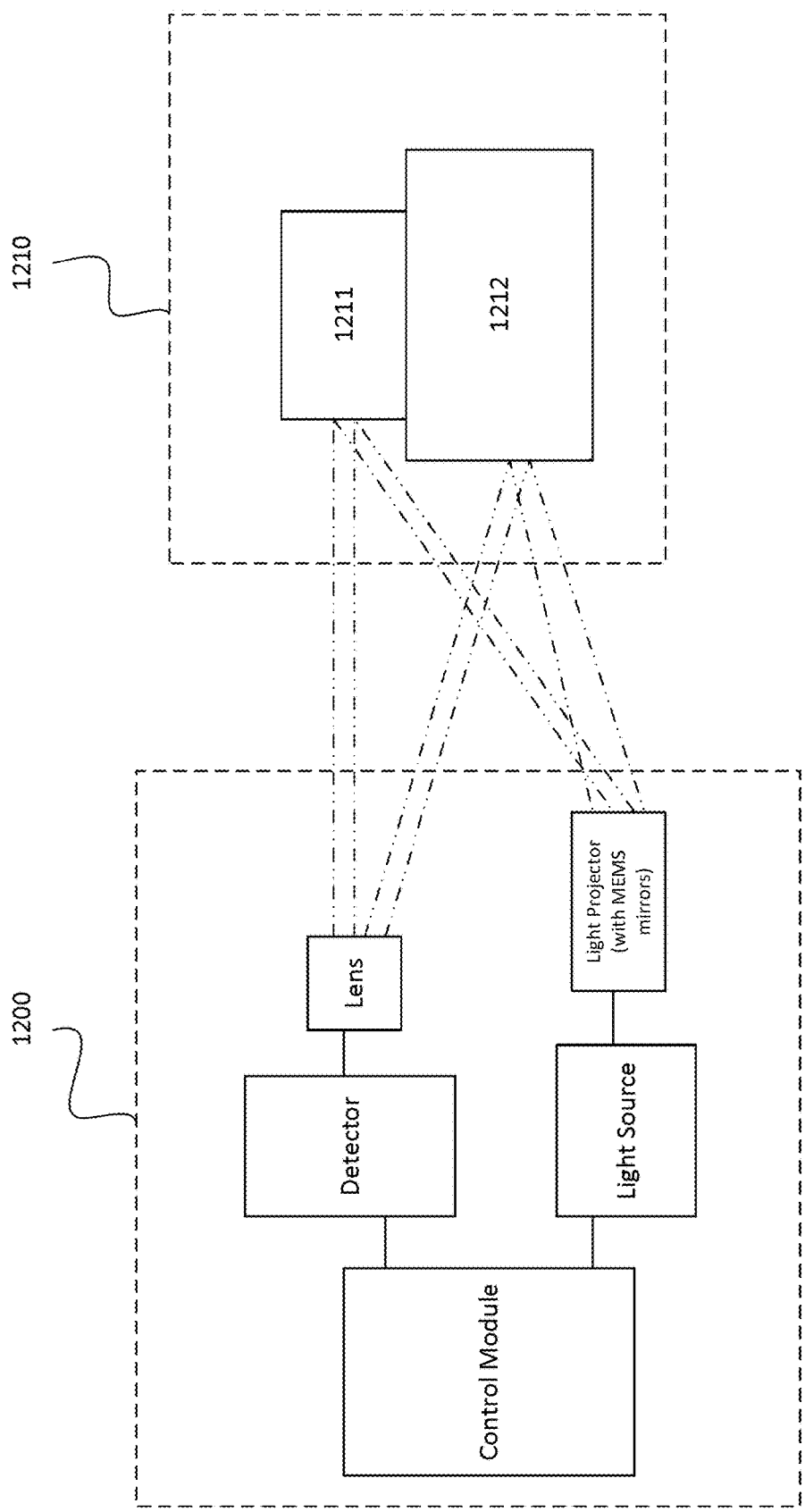
FIG. 12 is a simplified diagram illustrating a raster scanning process of a lidar system according to embodiments of the present invention.

FIG. 12 is a simplified diagram illustrating a raster scanning process of a lidar system according to embodiments of the present invention. This diagram is merely an example, which should not unduly limit the scope of the claims. One of ordinary skill in the art would recognize many variations, alternatives, and modifications. A lidar system according to an embodiment of the present invention includes, on a functional level, an optical transmitter and an optical transmitter, both of which operate under the control of a control module. As shown in FIG. 12, lidar system 1200 includes a light projector with MEMS mirrors that projects light generated by a light source (e.g., infrared laser). The light source and the light projector are coupled to a control module, which controls, among other things, timing of light transmission. The light projector directs the light as a predetermined number of points over a specific area (e.g., using a raster scanning process, covering one point at a time) or field of view (e.g., based on the angle). For example, the light projector includes optical elements that focuses the light to a predetermined area. Additionally, the light projectors, using its optical properties and light transmission characteristics, transmit modulated light signal (e.g., modulated with chirp signal) with a predetermined resolution. For example, laser light (e.g., in infrared wavelength range) is projected using raster scanning scheme.

For example, transmitted laser light is projected to a general area 1210, in which objects 1211 and 1212 are positioned. Multiple points of transmitted laser light are projected onto the respective surfaces of these two objects. Reflected light is received by the detector of lidar system 1200 as shown. The detector is coupled to the control module. For example, light (e.g., points of light reflected off objects 1211 and 1212) received by the detector is processed by the control module. By analyzing both transmitted light and received light, the control module is capable of determine both the shape and distance of objects 1211 and 1212. The control module, using image processing techniques, constructs images of objects 1211 and 1212 based on the light received by the detector. According various embodiments, lidar system 1200 uses adaptive techniques to improve image quality (e.g., improving resolution) and system efficiency (using fewer points for reconstructed images). Depending on the implementation, the present invention may incorporate other types of scanning technologies to implement the lidar system 1200, including, for example, scanning an array of transmitters and array of receivers to increase scanning speed. Scanning technologies can be based on optical phase array (OPA) in silicon photonics.

In various embodiments, lidar system 1200 analyzes a group of pixels using maximum likelihood detection techniques. For example, the resolution of a radar image is limited by the number of pixels that lidar system 1200 can project and receive within a period of time (e.g., scanning frequency associated with a given resolution), and such limitation is hardware imposed. To increase resolution, lidar system 1200 would need to increase projection and scanning frequency, at the cost of system size, power consumption, and thermal dissipation. Using processing techniques such as maximum likelihood detection, lidar system 1200 can improve its scanning resolution and accuracy while incurring minimal size, power, and thermal penalties.

As an example, the operating lidar system 1200 involves first generating a chirp signal. For example, the chirp signal can be generated by the control module. The chirp signal modulates the laser signal from the light source. For example, the light source projector includes a modulator that modulates laser light using with the chirp signal. The modulated light signal transmitted by the light projector reflects off object 1210, and the detector (e.g., optical receiver) sees delayed chirped light signal that is reflected from object 1210. The received optical signal is converted to an electrical signal, and it is characterized by multiple frequencies, which correspond to different objective distance (e.g., element 1211 and element 1212 correspond to different frequencies). The received signal is then digitized (e.g., using an ADC processor). An FFT is performed on the digitized data. For example, FFT process identifies frequency peaks that correspond to objects at different distances. According to embodiments of the present invention, additional digital signal processing is performed, such as clustering and maximum likelihood detection processed described below.

Figure 13:
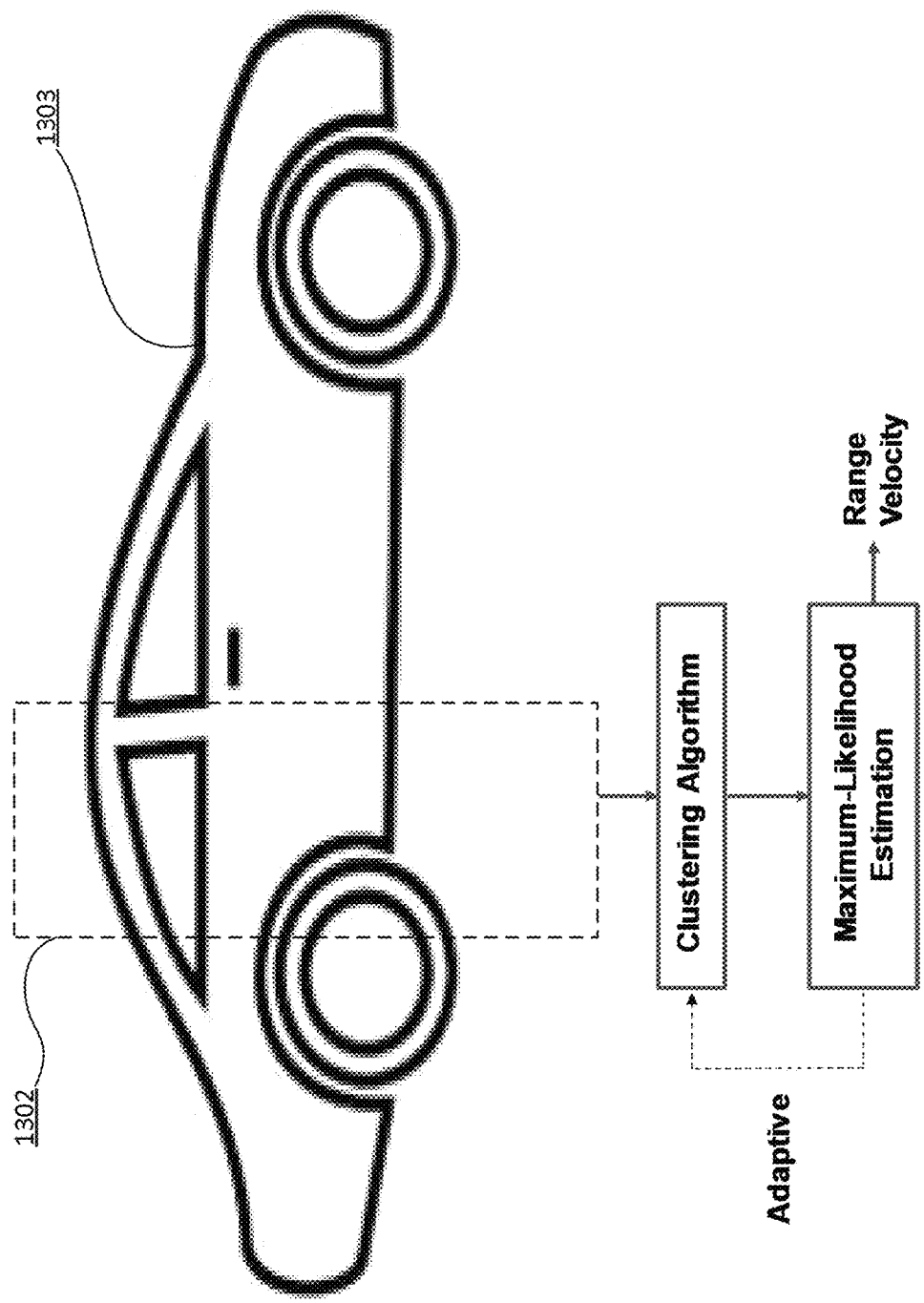
FIG. 13 is a simplified diagram illustrating spatial correlation mechanism of a lidar system according to embodiments of the present invention.

FIG. 13 is a simplified diagram illustrating spatial correlation mechanism of a lidar system according to embodiments of the present invention. This diagram is merely an example, which should not unduly limit the scope of the claims. One of ordinary skill in the art would recognize many variations, alternatives, and modifications. For example, a lidar system projects a number of points over an area, and a subset of these points reflects back from the car 1303. Among the subset of the received points, received points within region 1302 can be grouped into a cluster. For example, clustering refers process of organizing objects into groups whose members are similar in some way. Within region 1302, points reflected off the car 1303 can be grouped into a cluster. For example, deep learning algorithms may be used to group points into clusters. In various embodiments, a clustering algorithm a shown group points received at difference spaces into clusters. For each cluster of points, a maximum likelihood detection block estimates these points to improve estimates of distance, intensity, range, velocity, and/or other information. Additionally, the maximum likelihood detection block provides its estimates to the clustering algorithm in an adaptive feedback loop. The clustering algorithm as shown uses the maximum likelihood estimates to improve its clustering process. For example, based on the maximum likelihood estimate, clustering algorithm may remove points that are determined to dissimilar to other points within the cluster.

Figure 14:
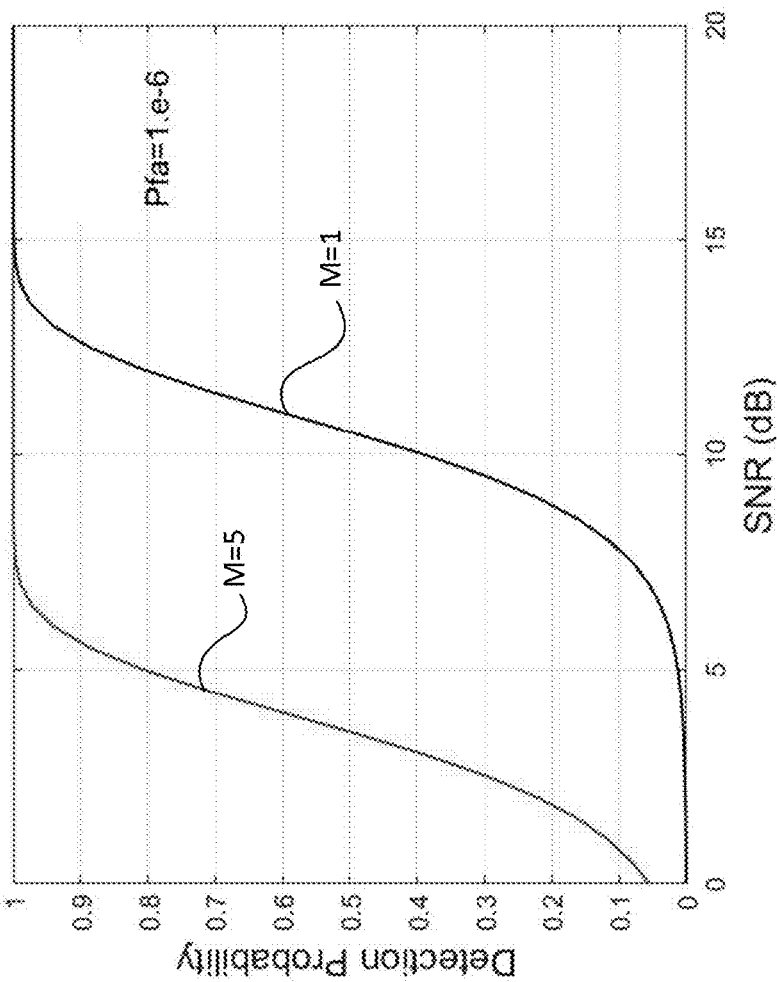
FIG. 14 is a simplified diagram illustration illustrating detection probability of a lidar system according to embodiments of the present invention.

FIG. 14 is a simplified diagram illustration illustrating detection probability of a lidar system according to embodiments of the present invention. As shown, the detection probability is improved by using maximum likelihood estimation over 5 points (M=5) compared with point by point detection (M=1). It is to be appreciated that resolution of a lidar system is determined by, among other characteristics, the maximum number of points both projected and received.

Figure 15:
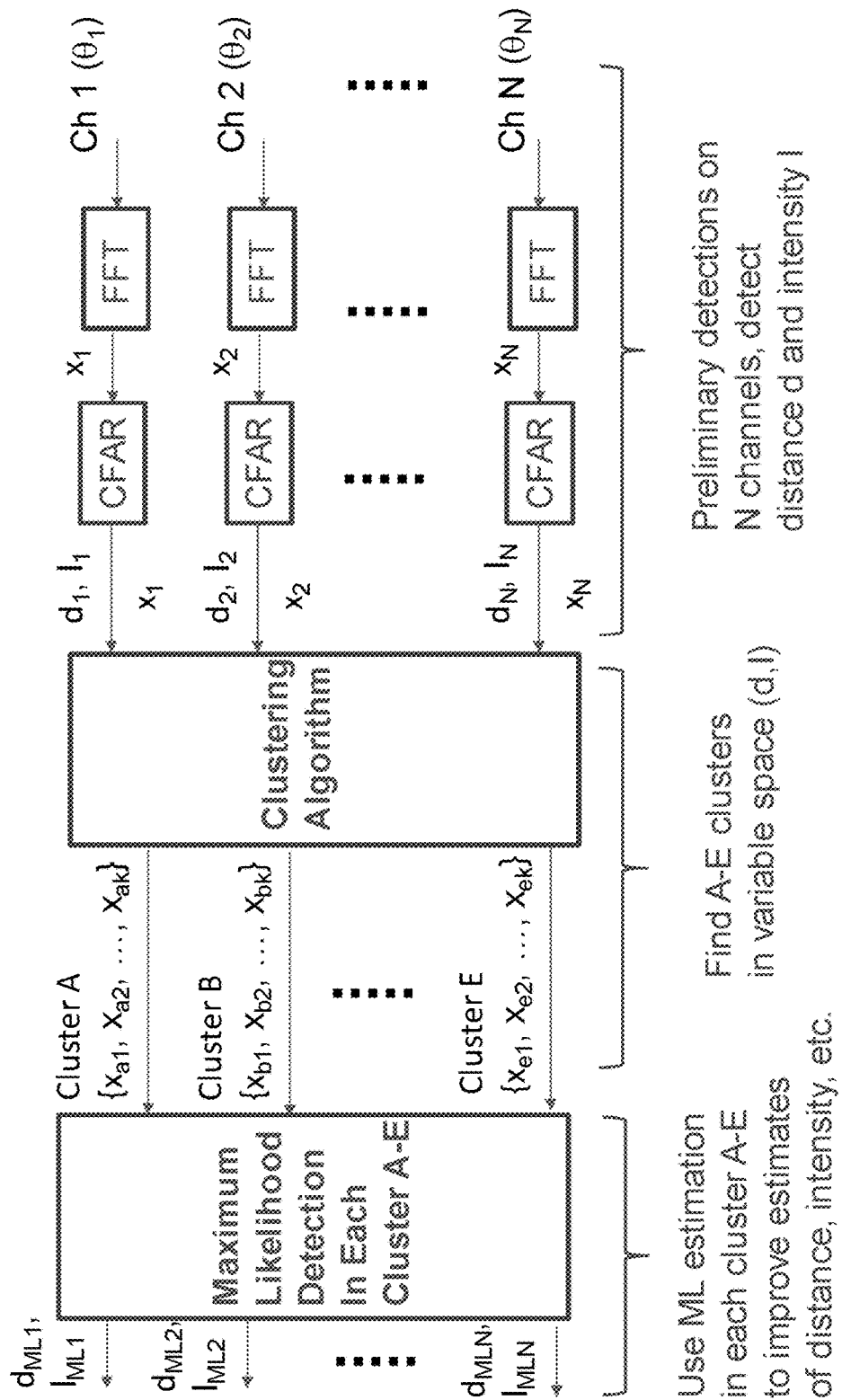
FIG. 15 is a simplified block diagram illustrating a signal processor according to embodiments of the present invention.

FIG. 15 is a simplified block diagram illustrating a signal processor according to embodiments of the present invention. This diagram is merely an example, which should not unduly limit the scope of the claims. One of ordinary skill in the art would recognize many variations, alternatives, and modifications. For example, function blocks in FIG. 15 may be implemented using one or more microprocessor unit. In various embodiments, these functional blocks may be implemented using hardware digital signal processing chips. For example, the control module 12 may be configured to implement these functional blocks, and these functional blocks are stored at an instructions or programs executed by a microprocessor.

As shown in FIG. 15, data (i.e., points received and processed by the optical detector of a lidar system) are detected and processed through N channels. For example, the number of channels is predetermined based on the lidar design (e.g., in terms of signal strength, sensitivity, cover area, field of view, etc.). For example, each of the channels is associated with a predetermined number of points (or an angle of view). By processing N channels in parallel, overall processing speed is improved. As parts of the preliminary detection process, FFT and CFAR processes are performed on each of the N channels in parallel. For example, CFAR at each channel determines whether a particular data point (or a group of data points) represents signal or noise. The outputs of CFARs are distance value $d_n$ and intensity value $I_n$.

The cluster algorithm block as shown then finds A-E clusters in variable space (determined with $d_n$ and $I_n$). Depending on the implementation, the cluster algorithm block can be configured to generate m number of clusters. Various clustering algorithms can be used, including K-means and hierarchical clustering algorithms. For example, the m number of clusters (i.e., cluster A through cluster E or other number of clusters) depends on the actual received data. The maximum likelihood detection (MLD) block improves the accuracy of each cluster as generated by the clustering algorithm block. For example, since data points in each cluster are deemed similar, distance and intensity (and/or other values) information are correlated while the noise is generally uncorrelated. Hence, maximum likelihood detection over multiple correlated points can improve the effective SNR. Referring to FIG. 13, received data points within cluster 1302 are mostly related to a region of the car 1303. If two points within cluster 1302 differs more than a predetermined threshold value (e.g., in terms of intensity and distance), the MLD block determines whether the difference reflects variation within cluster 1302 or attributes to noise. In various embodiments, the MLD block processes through each data point received from the clustering algorithm and output improved data points (e.g., distance, intensity, and/or other values). In various embodiments, the output of the MLD block is also provided to the clustering algorithm as an adaptive feedback process to improve the clustering decisions. For example, the clustering algorithm block in FIG. 15 updates data clusters based on the MLD outputs. For example, the output of MLD blocks comprises improved data sets (e.g., intensity and distance information) that can be used to construct lidar images.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A lidar system comprising:
   an optical transmitter configured to project chirped light signal;
   an optical receiver configured to receive a reflected light signal, the reflected light signal being based on the chirped light signal reflected off one or more objects;
   a transimpedance amplifier configured to convert the reflected light signal to an electrical signal;
   an analog-to-digital converter configured to convert the electrical signal to incoming data;
   a first fast Fourier transform (FFT) module configured to convert a first channel of the incoming data to first transformed data;
   a first constant false alarm rate (CFAR) module configured to generate a first data set from the first transformed data, the first data set including first distance information and first intensity information;
   a clustering module implemented by a processor and configured to group the first data set to a first cluster; and
   a maximum likelihood detection (MLD) module for updating the first data set.

2. The system of claim 1, wherein the CFAR module and the clustering module are implemented using a digital signal processor (DSP) chip.

3. The system of claim 1, further comprising:
   n−1 FFT modules for generating n−1 transformed data, where n is a positive integer greater than 1; and
   n−1 CFAR modules for generating n−1 data sets.

4. The system of claim 3, wherein the clustering module is configured to generate m clusters from the n−1 data sets.

5. The system of claim 3, wherein each of the n−1 data sets is associated with a predetermined number of points.

6. The system of claim 3, wherein each of the n−1 data sets is associated with a region in a field of view.

7. The system of claim 4, wherein the MLD module is configured to update the m clusters, where m is a positive integer.

8. The system of claim 7, wherein each of the m clusters is associated with a detected object.

9. The system of claim 1, wherein the chirped light signal comprises a predetermined number of points projected at a predetermined angle.

10. The system of claim 1, wherein the optical transmitter is configured to project points of light at a predetermined frequency.

11. A lidar receiver device configured to receive a light signal, the light signal being based on a projected light signal reflected off one or more objects, the lidar receiver device comprising:
    a lens for receiving the light signal;
    a transimpedance amplifier configured to convert the light signal to an electrical signal;
    an analog-to-digital converter configured to convert the electrical signal to incoming data;
    n fast Fourier transform (FFT) modules, each of the FFT modules being configured to convert a channel of the incoming data to a corresponding transformed data;
    n constant false alarm rate (CFAR) modules configured to generate n data sets based on the transformed data, each of the n data sets includes distance information and intensity information;
    a clustering module implemented by a processor and configured to group the n data sets into m clusters, where n and m are positive integers; and
    a maximum likelihood detection (MLD) module for updating the m clusters.

12. The device of claim 11, wherein each of the m clusters is associated with a detected object.

13. The device of claim 11, wherein the clustering module uses an output of the MLD module to update the m clusters.

14. The device of claim 11, wherein the FFT module and the CFAR module are implemented by a digital signal processor (DSP).

15. The device of claim 14, wherein the clustering module and the MLD module are implemented by the DSP.

16. The device of claim 11, wherein the MLD module is configured to provide sets of distance and intensity information.

17. A method of operating a lidar, the method comprising:
    projecting light points by an optical transmitter;
    receiving reflected light points by an optical receiver, the reflected light points being based on the projecting light points reflected off one or more objects;
    converting the received light points to electrical signals;
    converting the electrical signals to digital signals;
    performing fast Fourier transformation (FFT) on the digital signals to generate n channels of data;
    performing constant false alarm rate (CFAR) detection on the n channels of data to generate n data sets, each of the n data sets includes distance information and intensity information;
    grouping the n data sets to m clusters, where n and m are positive inverters; and
    performing maximum likelihood detection (MLD) on the m clusters.

18. The method of claim 17, further comprising updating the m clusters based on output of the MLD.

19. The method of claim 17, further comprising modulating a light signal using a chirp signal, the light signal being associated with the light points.

20. The method of claim 17, further comprising generating an image using at least the n data sets.

* * * * *